Figure 4:
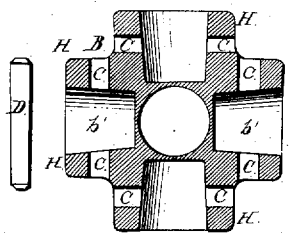
Figure 2:
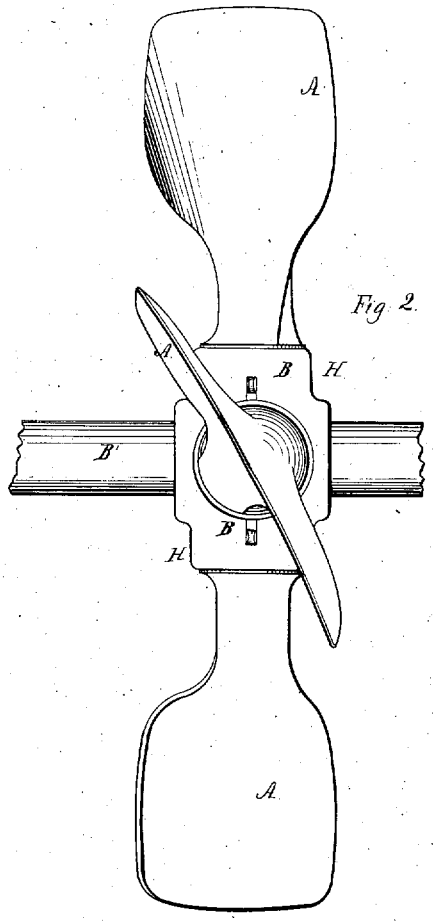
Figure 5:
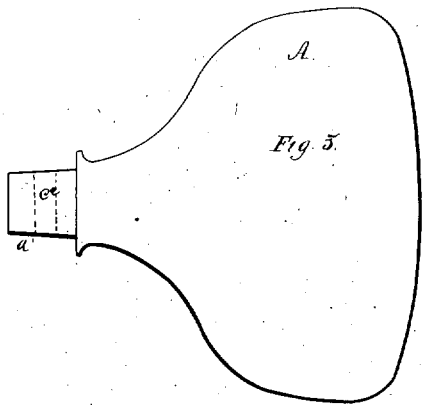

Sheet 1, 2 Sheets.
H. O. Perry.
Screw Propeller.
No. 1,467. Reissued Apr. 28, 1863.
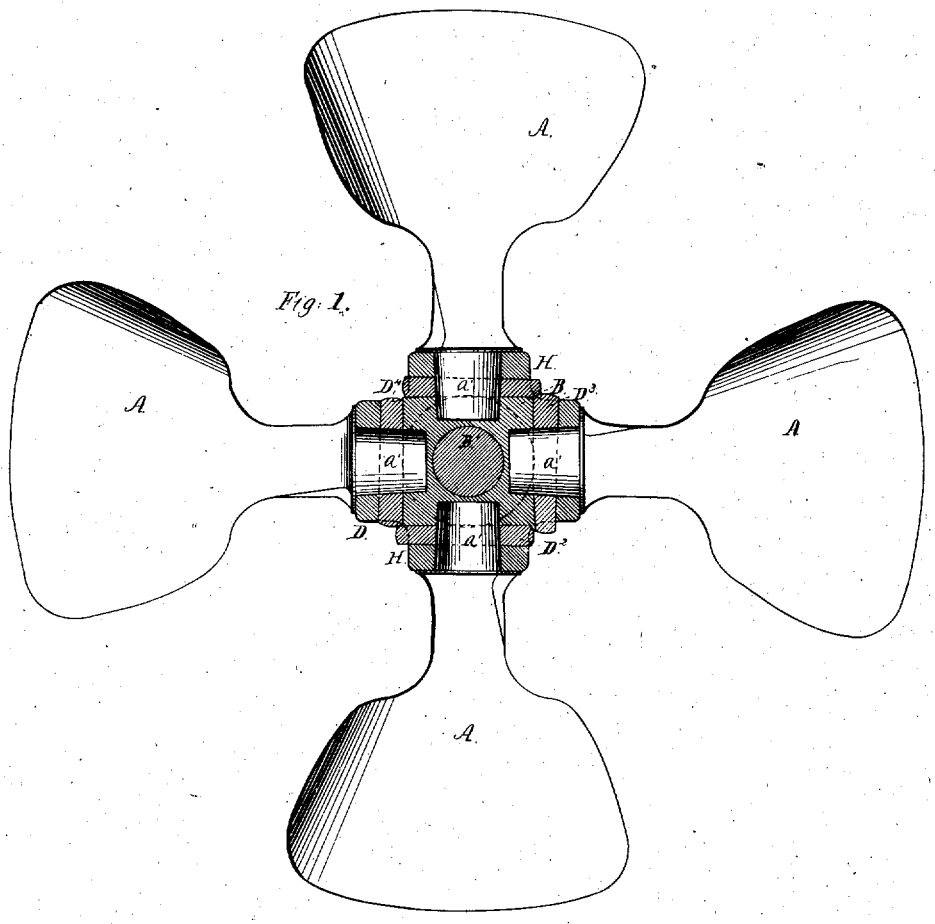
Witnesses:
C. Osborne
M. P. Fillmore
Inventor:
Sidney Shepard
N.Y.C.
By E. B. Forbush Atty Sheet 2, 2 Sheets.

H. O. Perry.

Screw Propeller.

No. 1,467. Reissued Apr. 28, 1863.

Witnesses:
E. Osborne
M. P. Fillmore

Inventor:
Sidney Shepard
assee
By E. B. Forbush
Atty.

UNITED STATES PATENT OFFICE.

SIDNEY SHEPARD, OF BUFFALO, NEW YORK, ASSIGNEE OF HORATIO O. PERRY.

IMPROVED SCREW-PROPELLER.

Specification forming part of Letters Patent No. 22,266, dated December 7, 1858; Reissue No. 1,467, dated April 28, 1863.

*To all whom it may concern:*

Be it known that HORATIO O. PERRY, of the city of Buffalo, in the county of Erie and State of New York, heretofore invented certain Improvements in Screw-Propellers, for which Letters Patent of the United States were, on the 7th day of December, 1858, granted to the said PERRY and SIDNEY SHEPARD, as the assignees of the said PERRY. Also, be it known that the said HORATIO O. PERRY has in due form of law assigned his whole interest in the said invention, improvement, and Letters Patent to the said SIDNEY SHEPARD, of the city of Buffalo aforesaid. Now, therefore, I, the said SIDNEY SHEPARD, assignee as aforesaid, by virtue of the statute in such case made and provided, do hereby declare that the following is a full, clear, and exact description of the said invention and improvement, reference being had to the accompanying drawings, making a part of this specification, in which—

Figure I is an end elevation of said screw-propeller, the hub being shown in section. Fig. II is a plan view. Fig. III is a plan of the hub. Fig. IV is a transverse section of the hub.

The nature of the said invention relates to improvements in that class of screw-propellers in which the hub (or boss) and blades are made separately, and afterward secured to each other to form the propeller, the improvements being in making the whole (or substantially the whole) of the shank end of the blade, which enters the hub, and from which the blade derives its main strength and support in the hub, conical or tapering, with a corresponding taper in the socket of the hub, so that the shank can in a simple manner and without difficulty be made to fit perfectly tight in the socket, and so that a key may be inserted into a mortise in the hub and shank in a manner to "draw" and hold the shank firmly in its place, and so that in case a blade is broken it can be easily replaced by a new one without "docking" the vessel.

Letters of like name and kind refer to like parts in each of the figures.

A represents the blade, which is cast separately from the hub, and which may be made of any desirable form, size, and "lead," the particular improvement in the blade being in making the shank end tapering or conical, as shown at $a'$ in Figs. I and III, with a mortise through the shank, as shown at $c^2$, Fig. III. The blade, when cast, may be put into a lathe and turned or finished to any desirable taper, the degree of taper not being important, observing at all times that the taper must be sufficient to insure a perfect fit in the socket, and so that it can be easily removed from the socket in case the blade is broken and admit of a new blade being put in. When great care is taken in casting, the shank may be made sufficiently true and smooth as not to require the use of a lathe.

B represents the hub or boss, which is cast as a whole separately from the blade, and is made sufficiently heavy to correspond with the size and form of the blade. The socket to receive the shank end of the blade is formed in casting, and is shown at $b'$, Fig. IV. It is made of a true taper, to correspond with the shank, so that the shank will fit therein perfectly tight. It is made a little deeper than the length of the shank, and a mortise is made through the hub and crosswise of the socket, as shown at $c$, Fig. IV, which corresponds with the socket $c^2$ through the shank, so that when the key is driven in it will draw upon the shank and insure a firm and unyielding connection of the blade to the hub.

In order to provide for keying the shank to the hub, and at the same time insure sufficient strength in the hub to resist the strain which this mode of connecting the blade would subject it to, it became necessary to make a new form of hub. For this purpose there are as many sub-bosses projected from the main hub as there are blades to be attached, which sub-bosses are at right angles to the propeller-shaft, and are shown at H. They rise sufficiently from the main hub to admit of a mortise being made through transversely, as shown at $c$, in which a key can be inserted and driven clear through, as shown in the drawings, Figs. I and IV. This form of construction insures the requisite strength, and allows of easy and convenient access for the insertion or removal of the keys whenever it becomes necessary.

B′ is the axle or shaft upon which the propeller is secured.

The key or wedge used to hold or fasten the blade to the hub is shown at D. It is made tapering, and the mortises through the hub and shank are so arranged in relation to each other that when the key is driven in it will draw upon the shank and hold it firmly in its place in the socket. There is one key to each blade, and there may be two, three, four, or more blades, as may be desired. The mortises are also so arranged that when the keys are driven in the second key will hold the first key in place, and the third will hold the second, and the fourth will hold or lock the third. This is accomplished as follows: After the first shank is set into its socket the first key, D, is driven in, which must be too short to stand in the path of either of the others. Then the second shank is set in and the second key, $D^2$, is driven in, its narrow end lapping onto the wide end of D. Then the third shank is set in and the third key, $D^3$, is driven in, its narrow end lapping onto the wide end of $D^2$. Then the fourth shank is set in and the fourth key, $D^4$, driven in, its narrow end lapping onto the wide end of $D^3$. The last key, $D^4$, is confined or held in place by ordinary means. Thus one key is made to hold or lock the other. When it is desired to remove one or all of the keys and blades, the process above described is reversed. This manner of inserting the keys (so that one will hold or lock the other) is convenient and safe in practice where three or more blades are used, but is not deemed necessary to a realization of the full benefit and advantage of the conical shanks and sockets. In most cases the keys may be inserted independently of each other—*i.e.*, without overlapping or locking each other. The overlapping is due to increased length in the narrow end of the key, and to the arrangement of the mortises. Consequently a slight shortening of the narrow end of the key and a very slight variation in the position of the mortises would avoid this overlapping of the keys, while the essential principles of the improvement would be retained. Therefore any manner of inserting the key so that it will draw and hold a conical shank firmly within a conical socket is deemed to be within the principles of this improvement.

This improvement is generally applicable to screw-propellers of any size or pattern, but is more particularly applicable and useful to smaller wheels, such as are used on inland lakes, rivers, canals, and shallow-water navigation. A large experience of several years, and an extensive use of this wheel, has fully established the utility and importance of the improvement.

Advantages:

First. The shank can be made of less metal than if made cylindrical or straight, and it requires less labor and care to secure a perfect fit in the socket, and it stands more securely and strong when in, and in case the shank wears so as to get loose in the socket the key can be driven in farther, and thus draw and tighten the shank in the socket, which could not be done if the shank were straight or cylindrical. It is, in fact, the most simple, cheap, and effective mode of fastening the blade in the hub in use.

Second. In case the blade becomes broken, the old shank can be more easily removed from the socket for the reception of a new blade.

Third. In river, canal, and shallow-water navigation the blades of screw-propellers are liable from many causes to be often broken, and it is a desideratum to have them so constructed that in case a blade is broken a new one can be easily, cheaply, and quickly put in its place. This improvement answers all of these purposes and more in the most perfect and satisfactory manner.

Fourth. The hub being cast as a whole, and the sockets being made conical, as described, a hub of increased strength and simple and easy construction is thereby secured.

What is claimed as new and as the invention of the said HORATIO O. PERRY is—

Making that part of the shank end of the bladrs of screw-propellers which enters the hub, and from which the blade derives its main strength in the hub, tapering or conical, in connection with a corresponding tapering or conical socket in the hub, with a key so inserted as to draw and hold the shank firmly in its place in the hub, substantially as described.

SIDNEY SHEPARD.

Witnesses:
JOHN D. SHEPARD,
E. B. FORBUSH.